INVENTORS
TAKAHASHI ODA
JIRO MANAKA
KOZO MINAMIYAMA

BY *Wenderoth, Lind & Ponack*
ATTORNEYS

United States Patent Office 3,541,025
Patented Nov. 17, 1970

3,541,025
PROCESS FOR PRODUCING ACTIVATED CARBON IN AN ASCENDING TURNING CURRENT OF ACTIVATING GAS
Takashi Oda and Jiro Manaka, Ashiya, and Kozo Minamiyama, Minoo, Osaka, Japan, assignors to Takeda Chemical Industries, Ltd., Higashi-ku, Osaka, Japan
Filed Nov. 14, 1968, Ser. No. 775,689
Int. Cl. C01b 31/08
U.S. Cl. 252—421                          8 Claims

ABSTRACT OF THE DISCLOSURE

A process for producing activated carbon. A cyclone-type reaction chamber in a shaft kiln having a funnel-shaped fluid flow distributor in the lower part of the reaction chamber is continuously charged with a carbonaceous material laterally through the lower portion of the shaft kiln wall at a point above the flow distributor. Simultaneously activating gas is supplied to the reaction chamber through the fluid flow distributor at the lower part of the chamber and through at least one gas inlet in the cylindrical side wall of said chamber in a nearly tangential direction with respect to the side wall of the reaction chamber, thereby to activate said carbonaceous material. The activated carbon and the gas are discharged continuously from the top of said reactor, and at the same time the impurities contained in the carbonaceous material or formed during the activation of the material are removed from an exhaust port provided at the bottom of the reactor.

---

This invention relates to improvements in a process for continuously producing activated carbon by activation of carbonaceous material with oxidizing gases in a fluidized bed.

Heretofore, the most practical process for producing activated carbon by activation of carbonaceous material with oxidizing gases in a fluidized bed which can be carried out on an industrial scale comprises generally contacting carbonaceous material with steam and hot air in a cylindrical reaction chamber. The steam and hot air are introduced through a flat plate flow distributor provided at the bottom of the reaction chamber so as to flow upwardly therein. The thus produced and fluidized activated carbon is continuously discharged from the reaction chamber.

However, in this known method, the reaction temperature distribution inside the reaction chamber is not kept uniform, and constant homogeneity cannot be obtained, especially with respect to the degree of activity and particle size of the activated carbon being produced. Moreover, in the known method, impurities obtained in the course of the activation are not completely eliminated by the flat flow distributor, and its thermal efficiency is quite low.

It has been a desideratum in this field to improve the various defects in the above-described known method.

The principal object of the present invention is to provide an improved process for continuously producing activated carbon which is homogeneous with respect to the degree of activity and particle size, and which process has a good yield and excellent thermal efficiency, by activation of carbonaceous material by oxidizing gases in a fluidized bed.

Other objects of the present invention will be made clear in the following discussion.

The objects of the present invention are achieved by a process for producing activated carbon which comprises providing a reactor consisting of a shaft kiln having a cyclone-type reaction chamber therein and a funnel-shaped fluid flow distributor at the lower part of the reaction chamber. Said reaction chamber is continuously charged with a carbonaceous material from the side thereof, and activating gas is simultaneously supplied to the reaction chamber through the fluid flow distributor at the lower part of the chamber and through gas inlet ports provided in the cylindrical side wall of said chamber and directed in a substantially tangential direction with respect to the side wall of the reaction chamber, whereby said carbonaceous material is activated. The activated carbon is continuously discharged from the top of said reactor, and at the same time the impurities contained in the carbonaceous material or formed during the activation of the material are removed from an exhaust port provided at the bottom of the reaction chamber.

The invention will now be described in greater detail with reference to the accompanying drawing, in which:

FIG. 1 is a vertical sectional view of an apparatus according to the invention to be used for the process of the invention; and FIG. 2 is a transverse sectional view of the apparatus taken along the line II—II of FIG. 1.

As shown in the drawings, the apparatus comprises a reaction chamber 1 within a shaft kiln 2. A screw conveyor 3 opening into the lower portion of the kiln charges said reaction chamber 2 with the necessary amount of a carbonaceous material from a hopper 4. An air duct 5 and a steam pipe 6 feed air and steam to a preheater for preheating the air and steam. A pipe 8a is connected between preheater 8 and a funnel-shaped fluid flow distributor 9 and supplies air and steam to be uniformly dispersed into the reaction chamber 1 through the distributor 9. The distributor 9 is provided with a pipe 10 for discharging impurities from the system. Opening into the chamber 1 through the side wall are inlets 7 for supplying air or other oxidizing gas to the reaction chamber 1. Pipes 7 are substantially tangential to the inside of the kiln wall 2. A port 11 is provided at the top of kiln wall 2 for discharging the product.

The carbonaceous materials which are treated according to the present invention are exemplified by granulated charcoal, lignite and coal. Gases used in the activation in the present invention are exemplified by steam, air and other oxidizing gases.

As described above, in carrying out the process of the present invention, an apparatus is used which comprises a shaft kiln having a cyclone-type reaction chamber and provided at the bottom with (1) a gas inlet, (2) a funnel-shaped fluid flow distributor, and (3) a discharge pipe which permits continuous discharge of solid lumps of impurities mixed in the raw material and also ashes formed as a result of the reaction. The kiln is also provided with a raw material supplying apparatus which can feed carbonaceous material continuously to the kiln, one or more gas inlet pipes for supplying activating gas, and a port for discharging the active carbon at the top thereof.

The inlet for the activating gas is so designed as to blow in the gas in a tangential direction with respect to the kiln wall. One such inlet is satisfactory for the purpose of the invention, but in many cases more than two inlets will give better results. When more than two spouts are provided, it is advisable to position them at different heights.

With such an apparatus, steam, air, or other oxidizing gas used for activation is supplied not only from the bottom of the reaction chamber through the fluid flow distributor, but is also supplied through one or several gas inlets in the cylindrical side wall of the reaction chamber at an angle or angles near the tangential direction. Therefore, the particles of the carbonaceous material fed in continuously by a raw material supplying apparatus in the side wall or subjected to the actions of ascending and turning currents. Due to the difference in the centrifugal force caused by the turning current, the particles take different courses in the same reactor, depending on the particle size and weight corresponding to the degree of activation. It follows, therefore, that if a suitable gas inlet velocity and carbonaceous material are selected, feeding velocity retention time in the reaction chamber can be obtained depending on the particle size and bulk density of the carbon. Carbon particles activated in this way are led by the ascending current of activating gas supplied through the fluid flow distributor at the bottom of the reactor, up to the discharging port at the top of the reactor, and are continuously discharged therethrough.

Carbonaceous materials actually contain impurities such as sand and soil, and form some ash during activation. Thus, deposition of such impurities on the bottom of the reactor is inevitable. In an apparatus having a flat-plate flow distributor employed in the known method, those impurities form a deposit of gradually increasing thickness on the plate, and eventually the gas fluidization becomes non-uniform and finally the distributor ceases to function correctly.

The apparatus of the present invention is equipped with a funnel-shaped fluid flow distributor, which causes foreign matter to fall successively downward without accumulating on the distributor, and to be discharged from the reaction chamber through a port provided for that purpose. Thus, the gas supplied from the bottom of the reactor is always dispersed uniformly, and the flow of the material particles in the reactor is constantly kept uniform.

According to the process of the invention, the reaction chamber which constitutes the essential part of the apparatus for the manufacture of activated carbon by activation with oxidizing gas is a cyclone-type, and gas is blown into the chamber in such manner that a gas flow from the bottom thereof causes an ascending current, and, simultaneously, a gas flow from the cylindrical side wall causes a current in the tangential direction. These currents together form a special combined gas flow which ascends and revolves and is discharged from the top of said chamber. Gas discharged from the chamber is re-circulated to the reaction chamber through the gas inlets in the cylindrical side wall of the reaction chamber. At the same time, elimination of impurities in the carbonaceous material such as soil and sand, and also the ash produced by the reaction, which has heretofore caused the greatest difficulty in ordinary fluid flow activation processes, is accomplished successfully by the discharge means provided at the bottom of the kiln.

A suitable amount of a carbonaceous material is continuously supplied into the unique gas flow as above described, and the material is fluidized and partially oxidized. While the material is floating in the gas, depending on the particle size and the degree of activation, those particles subject to a larger centrifugal force move toward the kiln wall, whereas those subject to less centrifugal force move toward the center of the reaction chamber. Thus, light particles float upward on the ascending current, while the heavy particles around the light particles are thoroughly activated because of the longer distance through which they must move and are then discharged from the system. Of the heavier particles which move toward the kiln wall, those too heavy to ascend will gradually descend along the wall, and further react with the gas in the lower part of the reaction chamber below the gas inlet ports in the side wall. They will become lighter by degrees as the reaction progresses, until they become light enough to float in the gas current and begin to ascend. Then the particles will be sufficiently activated and lightened and will go on ascending for ultimate discharge from the system. Insufficiently activated particles are caused to move outwardly by the circular currents when they reach the level of the gas inlet ports and are again caused to move along the inner surface of the kiln wall by the centrifugal force caused by the current around the side walls for further activation. Thus, the carbonaceous material is suitably activated and discharged from the reaction chamber, with the particles taking most suitable courses, depending on the particle sizes and the degrees of activation. In other words, even a carbonaceous material with a relatively broad range of particle sizes can be automatically separated, and can be activated under optimum conditions for the respective particle sizes while maintaining a constant equilibrium.

Usually, operation with a continuous supply of carbonaceous material inevitably results in gradual deposition of the ash separated from the material and soil, sand and other impurities in the material, on the bottom of the reaction chamber. The deposit formed in this way on a flat-plate fluid flow distributor of an ordinary reactor will subsequently clog the gas openings in the distributor and make the distributing action non-uniform. There is no such danger in the apparatus of the present invention, because it employs a funnel-shaped fluid-flow distributor. If the fluid flow distribution becomes non-uniform, local reaction of the material with the gas will take place, with a consequent decrease in the yield and deterioration of the quality of the product. This type of trouble is completely precluded in a reactor equipped with a funnel-shaped fluid flow distributor, since the deposits gradually slide along the inclined surface of the distributor toward the center and gather at the bottom of the reactor for discharge out of the system. Hence, the fluid flow distributor is kept in a constant condition, and uniformity of gas dispersion which exerts the most important effects on the quality and yield of the product in fluidized activation is assured.

Assuming, for example, that a carbonaceous material containing 0.5% of foreign matter, such as soil and sand, is charged into a reactor at a rate of 200 kg. per hour, then as much as 1 kg. per hour of soil and sand are deposited on the fluid flow distributor, together with the ash formed as the by-product during the reaction. The deposition is particularly remarkable on the side on which the port for charging the material is located. Therefore, if a flat plate distributor is used, the uniformity of the diffused gas flow is gradually affected with the result that local excessive oxidizing reactions take place, thereby materially affecting the yield. If the foreign matter is not eliminated, the same phenomenon occurs even in a reactor employing a funnel-shaped distributor, because then the gas flow is not completely uniform.

An example comparing the effects of elimination and retention of foreign matter upon the yield and quality of the product, 24 hours after the start of the operation, is given below.

| | When foreign matter is— | |
|---|---|---|
| | Not eliminated, percent | Eliminated, percent |
| Yield from material | 21 | 27 |
| 0.5 N-KMnO₄ | 60.1 | 62.5 |
| 0.5 N-iodine adsorption | 75.2 | 78.0 |

As will be apparent from the above table, elimination of foreign matter plays a very important role in the process of the invention. This operation may be carried out either continuously or intermittently. Continuous elimination of impurities can be conveniently effected by such a means as a screw conveyor or rotary valve. Usually, however, the amount of such foreign matter is not great, and intermittent removal is enough. For the latter purpose, it is advisable to provide a double dumper or the like on the reactor, and operating it to remove the foreign matter at suitable intervals of time. Even more satisfactory results are obtained by mounting an agitator in the proximity of the inner surface of the funnel-shaped fluid flow distributor and by revolving said agitator slowly, thereby to facilitate displacement of the impurities deposited on the flow distributor toward the discharge port.

While the process of the invention comprises, as above described, activation of a carbonaceous material according to the particle size and other factors by making use of the mutual action of gas flows in two directions, namely in the tangential and axial directions of a reactor, it is particularly characterized by a cyclonic ascending current which is produced by regulation of the amount of gas supplied in the tangential direction through the surrounding wall. Improvement of the adsorptive capacity of activated carbon has heretofore been attempted by supplying gas solely from the lower part of the reactor. However, this has been achieved only by increasing the amount of the gas per charge of the material, with consequent deterioration of the homogeneity of the product and very poor yield. Thus, economic production of active carbon on an industrial scale has not been justified by processes so far proposed. Generally, the amount of gas fed through the lower part of the reactor is governed by the incipient fluidization velocity of the ctarbonaceous material particles used, and at a slower gas velocity, a stabilized fluidizing reaction is impossible, because the carbonaceous particles fail to form a fluidized bed. Conversely, as the amount of the gas fed through the lower part increases so that the velocity of the gas rising in the reactor approaches the terminal velocity of the carbonaceous material particles used, the carbonaceous particles tend to be discharged out of the reaction system even though they have not been thoroughly activated. Since the incipient fluidization velocity and the terminal velocity are dependent on the size, shape, and bulk density of the carbonaceous material to be used, the amount of gas to be supplied to the lower part of a reactor must be within a certain range if the carbonaceous material to be used and the inside diameter of the bottom of the reaction chamber are established.

On the other hand, the ratio of the total amount of the oxidizing gas to the carbonaceous material used is generally constant, depending on the quality of the product desired and economic consideration. Therefore, in activation by the process of the invention, the preferred ratio of the amount of gas supplied to the lower part to that fed in sidewise is governed by the material to be used and the inside diameter of the bottom of the reaction chamber. Generally, the smaller the particle size of the carbonaceous material and the smaller the inside diameter of the bottom of the reaction chamber, the less the amount of the gas supplied to the lower part of the reactor should be. Parenthetically, it is recommended that the supply of the gas from the side wall be through several ports instead of one.

A specific example will now be given with reference to the apparatus shown in the drawing.

The reaction chamber 1 of the apparatus is preheated to 600° C., and air preheated to 100–500° C. is supplied from the air duct 5 through the fluid flow distributor 9 at the bottom of the kiln. At the same time, if necessary, preheated air or other oxidizing gas is also supplied through the inlet ports 7 in the wall of the chamber. Charcoal particles are continuously fed into the reaction chamber 1 from the hopper 4 by means of the screw conveyor 3. The charcoal particles burn and raise the temperature inside the reaction chamber 1. When a temperature suitable for activation (850–1200° C.) has been reached, steam is supplied through the steam pipe 6. Thus, a mixture of oxidizing gas and steam preheated by the preheater 8 is introduced into the reaction chamber 1, and the charcoal particles are subjected to oxidizing and water gas reaction by the turning and ascending currents, and are finally discharged out of the reactor through the discharging port 11. Gas discharged from the discharging port can be re-circulated to the reaction chamber through the gas inlets in the cylindrical side wall of the reaction chamber.

Some of the gas inlets 7 are used only for introducing the re-circulated gas into the reaction chamber, while the rest of the gas inlets are used for introducing fresh gas into the chamber. However, all of or a part of the gas inlets can be used for introducing not only fresh gas, but also recirculated gas into the chamber. Impurities formed during the continuous operation (including soil, sand, and other foreign matter originally contained in the raw material) are eliminated from the system through the central portion of the funnel-shaped fluid flow distributor 9 and the discharge port 10. Thus the charcoal particles are always kept in a stabilized fluid condition and it is possible to manufacture a homogeneous product continuously for a lengthy period of time.

The results of an experiment conducted according to the process of the invention are given hereunder.

Type of apparatus: As shown (an endothermic one-stage fluidized reactor for the activation of charcoal).

Raw material: Charcoal of eucalyptus grown in Brazil.

| Activating conditions | (1) High grade | (2) Medium grade |
| --- | --- | --- |
| Quantity of raw material, kg./hr | 200 | 200 |
| Quantity of air supplied, m.³/min.: | | |
| Bottom | 3.6 | 4.2 |
| Side | 5.8 | 4.5 |
| Quantity of steam supplied, kg./hr | 70 | 65 |
| Temperature (° C.) reactor: | | |
| Lower part | 750 | 800 |
| Middle part | 1,100 | 1,030 |
| Upper part | 1,000 | 980 |
| Yield of product, kg./hr | 46 | 60 |
| Quality of refined product: | | |
| 0.5 N-KMnO₄ adsorption, percent | 80.2 | 61.1 |
| 0.0211 N-Iodine adsorption, percent | 99.2 | 98.6 |
| 1.05 N-Iodine adsorption, percent | 87.0 | 74.3 |
| pH | 6.3 | 6.5 |
| Ash, percent | 0.7 | 0.7 |

As will be understood from the above table, the process of the invention permits carbonaceous materials to be activated continuously and selectively under optimum conditions, regardless of wide variation in particle size, by creating unique flows in the reaction chamber. The activating reaction proceeds while the retention time of the carbonaceous material in the reactor is automatically controlled depending on the particle size and the degree of activation of the material. As a result, the material is subjected to the reaction when it is distributed in a constant condition between the outer turning current and the central ascending current within the reaction chamber, and the temperature distribution inside the reaction chamber is kept uniform. Moreover, the impurities formed during the reaction are successively eliminated, thereby to maintain the efficiency of the fluid flow distributor at a constant level. Thus, the reactive conditions are controlled quite uniformly and constantly, and a continuous activating operation is carried out with an extremely high efficiency.

What is claimed is:

1. A process for producing activated carbon which comprises continuously charging a cyclone-type reaction chamber in a shaft kiln having a funnel-shaped fluid flow distributor in the lower part of the reaction chamber, with a carbonaceous material laterally through the lower portion of the shaft kiln wall at a point above the flow distributor, simultaneously supplying activating gas to the reaction chamber through the fluid flow distributor at the lower part of the chamber and through at least one gas inlet in the cylindrical side wall of said chamber in a nearly tangential direction with respect to the side wall of the reaction chamber, thereby to activate said carbonaceous material, discharging the activated carbon and the gas continuously from the top of said reactor, and at the same time removing the impurities contained in the carbonaceous material or formed during the activation of the material, from an exhaust port provided at the bottom of the reactor.

2. A process as set forth in claim 1 comprising continuously removing impurities from the reactor through the lower central part of the funnel-shaped fluid flow distributor.

3. A process as set forth in claim 1 comprising intermittently removing impurities from the reactor through the lower central part of the funnel-shaped fluid flow distributor.

4. A process as set forth in claim 1 further comprising agitating the funnel-shaped fluid flow distributor for causing the impurities to flow along it.

5. A process as set forth in claim 1 wherein the carbonaceous material is charcoal granules.

6. A process as set forth in claim 5, wherein the charcoal granules are eucalyptus.

7. A process as set forth in claim 1 wherein the gas discharged from the top of the reactor is reintroduced into the chamber through the gas inlet in the side wall of the chamber.

8. A process as set forth in claim 1 in which there are a plurality of gas inlets in the side wall of the chamber, and the gas discharged from the top of the reactor is reintroduced into the chamber through some of the gas inlets.

References Cited

UNITED STATES PATENTS

| | | | |
|---|---|---|---|
| 1,634,478 | 7/1927 | Wickenden et al. | 252—421 |
| 1,634,480 | 7/1927 | Wickenden et al. | 252—445 |
| 1,641,053 | 8/1927 | Saver | 252—421 |
| 3,451,944 | 6/1969 | Finch | 252—421 |

DANIEL E. WYMAN, Primary Examiner

P. E. KONOPKA, Assistant Examiner

U.S. Cl. X.R.

23—277; 201—31, 36; 202—121; 252—445; 263—21